(12) United States Patent
Matsumura et al.

(10) Patent No.: US 7,277,134 B2
(45) Date of Patent: Oct. 2, 2007

(54) CHROMINANCE SIGNAL DEMODULATION APPARATUS

(75) Inventors: Toshihiro Matsumura, Yasu-gun (JP); Kazuya Miyashita, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 527 days.

(21) Appl. No.: 10/983,734

(22) Filed: Nov. 9, 2004

(65) Prior Publication Data

US 2005/0117063 A1    Jun. 2, 2005

(30) Foreign Application Priority Data

Nov. 10, 2003    (JP) ............... 2003-380557

(51) Int. Cl.
*H04N 5/455* (2006.01)
*H04N 9/66* (2006.01)
*H04N 9/77* (2006.01)

(52) U.S. Cl. ............... 348/638; 348/639; 348/640; 348/641; 348/662; 348/727

(58) Field of Classification Search ........ 348/638–641, 348/662, 727
See application file for complete search history.

(56) References Cited

U.S. PATENT DOCUMENTS

| 5,459,524 | A | * | 10/1995 | Cooper | ............... | 348/507 |
|---|---|---|---|---|---|---|
| 6,034,735 | A | * | 3/2000 | Senbongi et al. | ............ | 348/505 |
| 6,172,713 | B1 | * | 1/2001 | Morita | ............... | 348/557 |
| 6,522,366 | B1 | * | 2/2003 | Onodera et al. | ............ | 348/638 |
| 6,538,702 | B1 | | 3/2003 | Taketani et al. | | |
| 6,690,430 | B1 | * | 2/2004 | Takeshita | ............... | 348/638 |
| 6,833,875 | B1 | * | 12/2004 | Yang et al. | ............... | 348/665 |
| 6,947,096 | B2 | * | 9/2005 | Kumazawa | ............... | 348/488 |
| 7,027,102 | B2 | * | 4/2006 | Sacca | ............... | 348/572 |
| 7,224,407 | B2 | * | 5/2007 | Yoshii et al. | ............... | 348/638 |
| 7,227,585 | B1 | * | 6/2007 | Murdock et al. | ........... | 348/641 |

* cited by examiner

*Primary Examiner*—Brian P. Yenke
(74) *Attorney, Agent, or Firm*—Wenderoth, Lind & Ponack, L.L.P.

(57) ABSTRACT

An NTSC system chrominance signal demodulation apparatus is provided with a clock timing change circuit for burst-locking an input signal under the state where the phase is shifted by 90 degrees for every line, and phase axis rotation circuits for performing phase axis rotation, thereby to enable conversion of the phase axis of the burst signal. Therefore, demodulation of a PAL system chrominance signal can be carried out as well as demodulation of an NTSC system chrominance signal, and thereby demodulation of chrominance signals can be carried out using a common device regardless of the broadcast systems such as NTSC and PAL. Further, demodulation of chrominance signals can be carried out even under adverse conditions such as weak electric field or level compression of the burst signal.

13 Claims, 6 Drawing Sheets

CHROMINANCE SIGNAL DEMODULATION APPARATUS

FIELD OF THE INVENTION

The present invention relates to a burst lock circuit and a chroma killer control circuit in a chrominance signal demodulation apparatus for television signal processing.

BACKGROUND OF THE INVENTION

In recent years, digital processing of an analog television broadcast receiving device is advancing simultaneously with the advance of semiconductor technology, and particularly, importance is placed on realization of digital processing of the receiving device by a common device independently of the broadcast system (NTSC, PAL, SECAM, etc.).

Hereinafter, a conventional burst lock circuit will be described with reference to FIGS. 4 to 8.

Figure 4:
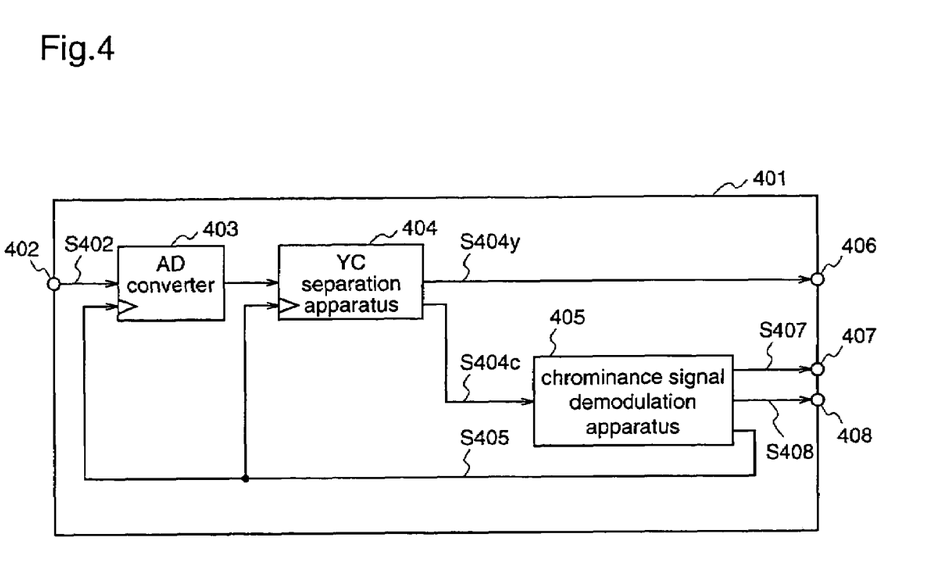
FIG. 4 is a block diagram illustrating the whole construction of a video demodulation apparatus.

FIG. 4 is a block diagram illustrating the whole construction of a video demodulation apparatus.

With reference to FIG. 4, the video demodulation apparatus 401 comprises a video signal input terminal 402, an A/D converter 403, a YC separation apparatus 404, a chrominance signal demodulation apparatus 405, a luminous component signal output terminal 406, an R-Y signal output terminal 407, and a B-Y signal output terminal 408.

A video signal S402 inputted through the video signal input terminal 402 of the video demodulation apparatus 401 is input to the A/D converter 403 in the video demodulation apparatus 401. In the A/D converter 403, the video signal S402 as an analog signal is converted into a digital signal according to a timing of a clock signal S405 outputted from the chrominance signal demodulation apparatus 405. The clock signal S405 is synchronized with a burst signal that exists in a back porch of the video signal S402, and it has a frequency twice or more as high as that of the burst signal, according to the sampling theorem of Nyquist. It is assumed that a clock signal S405 having a frequency four times as high as that of the burst signal is generated.

Next, the digital signal obtained by digitizing the video signal outputted from the A/D converter 403 is input to the YC separation apparatus 404.

In the YC separation apparatus 404, the digital signal outputted from the A/D converter 403 is separated into a luminous component signal S404y and a chrominance component signal S404c which are multiplexed in the video signal. The luminous component signal S404y is output to the outside of the video demodulation apparatus 401 through the luminous component signal output terminal 406. On the other hand, the chrominance component signal S404c separated by the YC separation apparatus 404 is output to the chrominance signal demodulation apparatus 405. Generally, the YC separation circuit is composed of a comb filter or a notch filter, and a band-pass filter.

In the chrominance signal demodulation apparatus 405, a clock S405 synchronized with the burst signal is generated and supplied to the A/D converter 403 and the YC separation apparatus 404. Further, the chrominance component signal S404c outputted from the YC separation apparatus 404 is separated into an R-Y component signal and a B-Y component signal. Thereafter, the R-Y component signal S407 and the B-Y component signal S408, which are separated by the chrominance signal demodulation apparatus 405, are output to the outside of the video demodulation apparatus 401 through the R-Y signal output terminal 407 and the B-Y signal output terminal 408, respectively.

Next, the internal structure of the chrominance signal demodulation apparatus 405 shown in FIG. 4 will be described in more detail.

Figure 5:
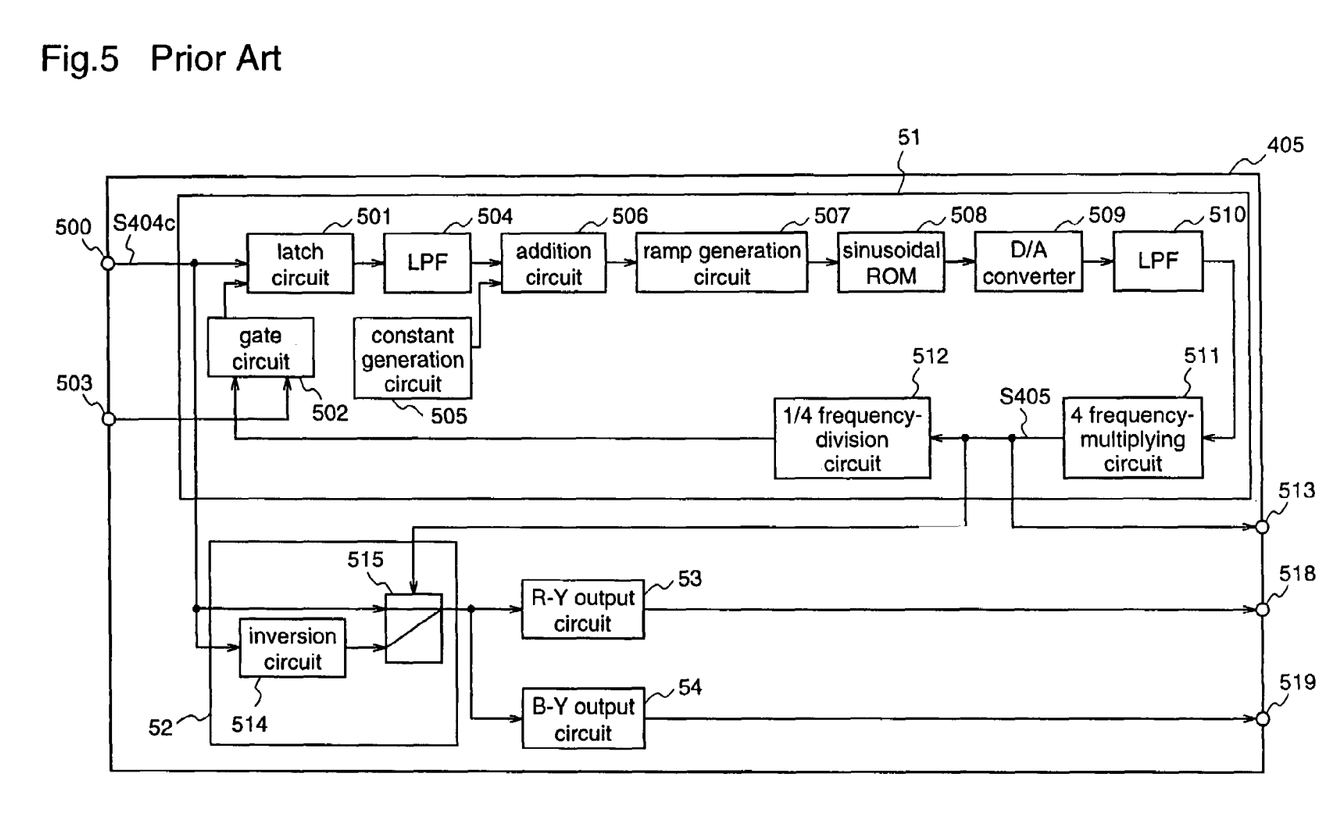
FIG. 5 is a block diagram illustrating a conventional chrominance signal demodulation apparatus.

FIG. 5 is a block diagram illustrating the construction of the conventional chrominance signal demodulation apparatus. The chrominance signal demodulation apparatus is aimed at receiving an NTSC system video signal.

In FIG. 5, the chrominance signal demodulation apparatus 405 comprises a chrominance component signal input terminal 500, a burst gate pulse input terminal 503, a loop filter 51, a chrominance signal multiplexing circuit 52, an R-Y output circuit 53, a B-Y output circuit 54, a 4FSC clock output terminal 513, an R-Y signal output terminal 518, and a B-Y signal output terminal 519.

The chrominance signal demodulation apparatus 405 is provided with the chrominance component signal input terminal 500, and a multiple-bit digitized chrominance component signal S404c is output to the loop filter 51 through the chrominance component signal input terminal 500.

The loop filter 51 generates a clock signal which is synchronized with the burst signal and has a frequency N times (N: integer not less than 2) as high as that of the burst signal. It is assumed that a clock signal S405 having a frequency four times as high as that of the burst signal is generated. The loop filter 51 comprises, as shown in FIG. 5, a latch circuit 501 comprising a group of flip-flops, a gate circuit 502, an LPF 504, a constant generation circuit 505, an addition circuit 506, a ramp generation circuit 507, a sinusoidal ROM 508, a D/A converter 509, a LPF 510, a 4 frequency multiplying circuit 511, and a ¼ frequency-division circuit 512.

The L/H terminals of the flip-flops constituting the latch circuit 501 are supplied with a signal which is obtained by subjecting the clock signal S405 that is outputted from the 4 frequency multiplying circuit 511 and has a frequency four times as high as that of the burst signal, to ¼ frequency-division by the ¼ frequency-division circuit 512, i.e., a signal having the same frequency as that of the burst signal, through the gate circuit 502. The gate circuit 502 performs a logical operation on the burst gate pulse inputted through the burst gate pulse input terminal 503 and the signal having the same frequency as that of the burst signal, which is output from the ¼ frequency-division circuit 512, so that the signal is supplied to the L/H input terminals of the flip-flops at only the timing of the burst signal.

The latch circuit 501 latches only the burst signal portion of the chrominance component signal S404c with the same cycle as the burst signal at the timing in which the signal is supplied to the L/H inputs of the flip-flops constituting the latch circuit 501. This eventually leads to sampling of the phase errors during burst lock.

Thereafter, the phase error components during burst lock, which are sampled by the latch circuit 501, are sent to the LPF circuit 504.

The LPF circuit 504 is a cumulative integration circuit, and integrates the phase error components which are sampled at the burst portion of the chrominance component signal S404c. If no phase error has occurred, the output of the LPF circuit 504 is zero, and the burst signal and the signal having the same frequency as the burst signal, which is output from the ¼ frequency-division circuit 512, are in complete agreement with each other in frequency and phase, resulting in burst lock.

The constant generation circuit 505 determines a center frequency for PLL operation. The constant generation circuit 505 outputs the center frequency when the output of the LPF 504 is non-zero, and outputs a constant value in accordance with the frequency of the burst signal when the output of the LPF 504 is zero, i.e., burst lock is carried out.

Further, the addition circuit 506 generates a value which is the sum of the phase error-components accumulated in the LPF 504 and the output of the constant generation circuit 505, and outputs the value to the ramp generation circuit 507. The ramp generation circuit 507 changes the inclination of the ramp waveform according to the output value from the addition circuit 506. For example, the larger the output value from the addition circuit 506 is, the steeper the inclination of the ramp becomes. Conversely, the smaller the value is, the gentler the inclination of the ramp waveform becomes.

The output from the ramp generation circuit 507 is connected to the addresses of the sinusoidal ROM 508. For example, assuming that there are n (0, 1, 2, 3, . . . n) addresses of the sinusoidal ROM 508, the output from the ramp generation circuit 507 corresponds to a sinusoidal function. That is, assuming that the address input to the ramp generation circuit 507 is "x" that is an arbitrary integer from 0 to n and its output is "y", the ramp generation circuit 507 outputs a value that is obtained by converting "y=sin(2πx/n)" to a digital value. The address inputted to the sinusoidal ROM 508 is reproduced with its sinusoidal wave being a digital value because the output of the ramp generation circuit 507 is a ramp. Further, when the output of the LPF 504 is non-zero, the phase can be varied to make the output zero by controlling the inclination of the ramp waveform, whereby the frequency of the output from the sinusoidal ROM 508 is varied.

Thereafter, the digital output from the sinusoidal ROM 508 is converted into an analog waveform by the D/A converter 509, and discrete noise components are removed by the LPF 510 from the output waveform of the D/A converter 509.

In the above-mentioned construction, it is possible to generate, as an output from the LPF 510, a burst lock clock having the same frequency and phase as those of the burst signal.

Then, the output from the LPF 510 is input to the frequency multiplying circuit 511, multiplied by four times, and output to the ¼ frequency-division circuit 512, the 4FSC clock output terminal 513, and the selector 515.

The ¼ frequency-division circuit 512 subjects the clock signal S405, which is output from the 4 frequency multiplying circuit 511 and has a frequency four times as high as that of the burst signal, to ¼ frequency-division to convert the signal into a signal having the same frequency as the burst signal, and thereafter, outputs the signal to the gate circuit 502.

Further, the 4FSC clock which is output from the multiplying circuit 511 and has a frequency four times as high as that of the burst clock is supplied from the 4FSC clock output terminal 513 to the A/D converter 403 and the YC separation apparatus 404, as shown in FIG. 4.

Next, the chrominance signal multiplexing circuit 52 separates the chrominance component signal supplied from the chrominance component signal input terminal 500 into an R-Y component signal and a B-Y component signal on the basis of the clock signal outputted from the loop filter 51, and outputs a signal in which the R-Y component signal and the B-Y component signal are multiplexed at alternate timings. The chrominance signal multiplexing circuit 52 is composed of a selector 515 and an inverter circuit 514 as shown in FIG. 5.

Hereinafter, the processings to be performed by the inverter circuit 514 and the selector 515 will be described in more detail.

In the NTSC or PAL broadcasting system, since the phase-modulated chrominance component signal S404c is transmitted, the carrier signal can be expressed as a sinusoidal wave as follows:

$$Cin = R \cdot \sin\{2\pi f_{sc} * t + \phi(t)\} \quad (1)$$

wherein fsc is the frequency of the burst signal (i.e., so-called sub-carrier frequency), and R is the amplitude. Further, $$\omega_{sc} = 2\pi f_{sc}$$

holds. Assuming that the sampling frequency in the A/D converter 403 shown in FIG. 4, i.e., the clock signal S405 is fs, $$4f_{sc} = fs$$

holds, and the sampling cycle T can be expressed by $$T = 1/fs$$

Moreover, since the video modulation unit 401 operates at a frequency four times as high as that of the burst clock, the respective sample points can be expressed by $$t = 4nT, (4n+1)T, (4n+2)T, (4n+3)T$$

When the data of the first sample point is substituted into formula (1), $$R\sin\{\omega_{sc}^*(4nT) + \phi(4nT)\} = \\ \sin\{2\pi f_{sc}^* 4n/4f_{sc} + \phi(4nT)\} = \sin\{2n\pi + \phi(4nT)\} = R\sin(\phi(4nT))$$

holds, and the term "$\omega_{sc}$" disappears.

Likewise, when the data of the second sample point is substituted into formula (1), $$R \sin\{\omega_{sc}*(4n+1)T + \phi((4n+1)T)\} = R \sin\{\omega_{sc}*4nT + \omega_{sc}*T + \phi((4n+1)T)\}$$

holds, and the first term in "Sin" becomes 2nπ, and the second term becomes $$\omega_{sc}*T = 2\pi f_{sc}/4f_{sc} = \pi/2$$

and therefore, $$= R \cos\{\phi((4n+1)T)\}$$

is obtained.

The above-mentioned formulae are summarized as follows:
the first sample point=R sin($\phi$(4nT))
the second sample point=R cos($\phi$((4n+1)T)) and the data at the first sample point changes to the same function format as the input signal (1), and the data at the second sample point changes to the cosine function.

Likewise, the third and fourth sample points are expressed as follows:
the third sample point=–R sin($\phi$((4n+2)T))
the fourth sample point=–R cos($\phi$((4n+3)T))

and the data at the third sample point has a sign opposite to that of the input signal (1). Further, the data at the fourth sample point has a sign opposite to that of the input signal (1), and changes to the cosine function.

In summary, it is possible to obtain an output signal having the same format of trigonometric function as the input signal which is a sinusoidal function, and excluding the carrier signal, by employing only the first and third sample points for the input signal. On the other hand, it is possible to obtain an output signal having a format of cosine function the phase of which is shifted by 90 degrees with respect to the input signal of the sinusoidal function, and excluding the carrier signal, by employing the second and fourth sample points.

Since demodulation for the phase-modulated NTSC system signal is controlled so that the sample data value corresponding to the first sample point of the burst signal becomes zero in the loop filter 51, the selector 515 outputs the first and third sample data as the R-Y component signal, and the second and fourth sample data as the B-Y component signal. At this time, the inverter circuit 514 operates to invert the signs of the data values at the third sample point and the fourth sample point, i.e., the sign of the data value at the first sample point is matched to the sign of the data value at the third sample point, and the sign of the data value at the second sample point is matched to the sign of the data value at the fourth sample point.

Thereby, the R-Y component signal and the B-Y component signal are multiplexed at alternate timings and outputted from the selector 515.

Thereafter, the R-Y component signal and the B-Y component signal which are outputted from the selector 515 at alternate timings are output to the outside of the chrominance signal demodulation apparatus 405 from the R-Y signal output terminal 518 and the B-Y signal output terminal 519 through the R-Y output circuit 53 and the B-Y output circuit 54, respectively.

Figure 6:
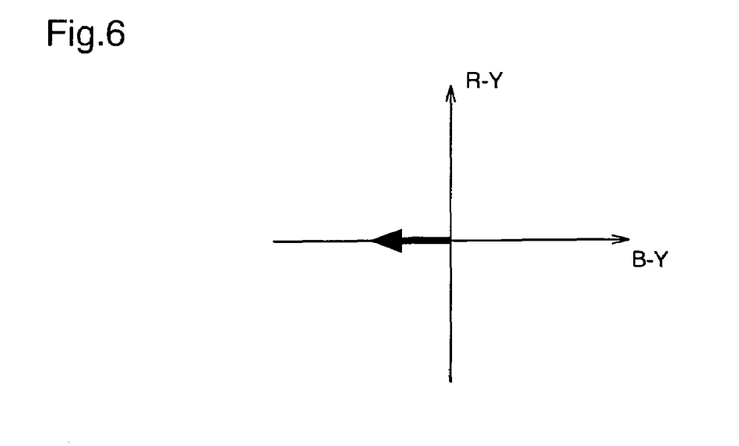
FIG. 6 is a diagram illustrating the phase of an NTSC system burst signal.

FIG. 6 is a diagram for supplementary description. In FIG. 6, the abscissa shows the phase of the B-Y signal, and the ordinate shows the phase of the R-Y signal. In the NTSC system, as shown in FIG. 6, the phase of the burst signal is perpendicular to the R-Y axis and parallel to the B-Y signal.

As described above, when the construction of the conventional chrominance signal demodulation apparatus is employed, the B-Y axis is parallel to the burst signal while the R-Y axis is perpendicular to the burst signal.

The above-described construction has the following problems.

The first problem is as follows. That is, although the conventional chrominance signal demodulation apparatus can burst-lock the NTSC system signal, it cannot burst lock the PAL system signal.

Figure 7:
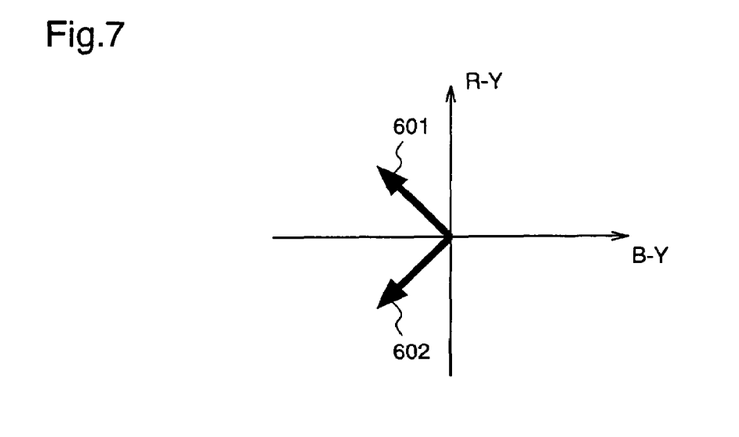
FIG. 7 is a diagram illustrating the phase of a PAL system burst signal.

The reason will be explained with reference to the phase of the PAL burst signal shown in FIG. 7. In FIG. 7, the abscissa shows the phase of the B-Y signal, and the ordinate shows the phase of the R-Y signal.

As shown in FIG. 7, in the PAL system, the phase of the burst signal is shifted for each line when it is transmitted. Therefore, even if the input signal is burst locked to match its phase to the phase of the burst signal 601 in the first line, the phase of the burst signal in the next line is shifted in the direction 602. So, in the above-mentioned conventional chrominance signal demodulation apparatus, stable pull-in characteristics cannot be secured, and demodulation of the PAL system signal cannot be carried out.

Further, in order to realize reception and demodulation of a NTSC system signal and a PAL system signal using a common device, a special unit for the PAL system should be prepared independently of the conventional NTSC system demodulation unit. However, when such independent PAL unit is provided, the circuit scale of the unit is simply increased, and the purpose of realizing a reduced circuit scale using the common device cannot be achieved.

Further, the second problem is as follows. Even if the phase of the burst signal can be made parallel to the phase axis of the R-Y signal in some way like in the case of the NTSC system under the state where the PAL system signal is being received, since the phase axis of the PAL burst signal is shifted by 90° for each line, it becomes necessary to accurately detect the orientation of the phase of the burst signal which changes for each line.

To be specific, even under adverse environments such as weak electric field or level compression of the burst signal, since the NTSC system signal just holds the same phase information for every line, normal demodulation can be carried out by only holding the phase information of the previous-line even in an abnormal situation where burst lock is released in a specific line. On the other hand, in the PAL system, since the phase of the burst signal is shifted by 90° for every line as described above, the phase information must be accurately detected. Especially, the orientation of the phase of the burst signal, i.e., the phase information as to whether the R-Y component signal of the burst signal is in the positive direction or in the negative direction, must be accurately detected. If the signal polarity, which is called a line ident signal, cannot be accurately detected, chrominance horizontal noise or the like undesirably appears on a screen of a television receiver or the like.

Further, the third problem is derived from a copy guard pulse that is inserted in a vertical blanking period of a medium such as a video decoder or a DVD device in recent years.

To be specific, although demodulation of the chrominance signal is carried out with reference to the burst signal, if a copy guard pulse is inserted in the medium, the sync separation circuit might malfunction to miss the timing when the burst signal exists. Thereby, particularly the possibility of improper detection of the line ident information is increased. Therefore, a countermeasure circuit against the case where the copy guard pulse is inserted in the medium must be further provided in the apparatus.

SUMMARY OF THE INVENTION

The present invention is made to solve the above-described problems and has for its object to provide a chrominance signal demodulation apparatus which enables reception and demodulation of an NTSC system signal and a PAL system signal using a relatively simple circuit construction even in a deterioration environment such as weak electric field or burst compression.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a chrominance signal demodulation apparatus comprises: a loop filter including a clock timing change unit which selectively outputs a clock signal synchronized with a burst signal, and a clock signal that is delayed by 90 degrees with respect to the phase of the clock signal synchronized with the burst signal, from a chrominance component signal that is a quantized signal, on the basis of the polarity of an R-Y component signal of a PAL system signal, the loop filter generating a clock signal that is synchronized with the burst signal and has a frequency N times (N: integer not less than 2) as high as that of the burst signal; a chrominance signal multiplexing unit for separating the chrominance component signal into an R-Y component signal and a B-Y component signal on the basis of the clock signal outputted from the loop filter, and outputting a signal that is obtained by alternately multiplexing the R-Y component signal and the B-Y component signal; an arithmetic unit for rotating, by 45 degrees, the phase axis of the multiplexed signal outputted from the chrominance signal multiplexing unit, and calculating correlation between the multiplexed signal and a 1H delay signal that is obtained by delaying the multiplexed signal by one cycle of a horizontal sync signal; an R-Y inversion unit for selectively changing the polarity of the R-Y component signal of the signal outputted from the arithmetic unit, on the basis of the polarity of the R-Y component signal of the PAL system signal; an R-Y output unit for outputting the R-Y component signal outputted from the R-Y inversion unit; and a B-Y output unit for outputting the B-Y component signal of the signal outputted from the arithmetic unit. Therefore, it is possible to receive and demodulate a PAL system signal by utilizing the color demodulation apparatus for demodulating an NTSC system signal.

According to a second aspect of the present invention, in the chrominance signal demodulation apparatus according to the first aspect, when the received signal is an NTSC system signal, the clock timing change unit included in the loop filter outputs only the clock signal synchronized with the burst signal, and the R-Y output unit and the B-Y output unit directly receive the multiplexed signal outputted from the chrominance signal multiplexing unit, and output the R-Y component signal and the B-Y component signal from the R-Y output unit and the B-Y output unit, respectively. Therefore, it is possible to receive and demodulate both of an NTSC system signal and a PAL system signal using a common device, resulting in a reduction in the circuit scale of the chrominance signal demodulation apparatus.

According to a third aspect of the present invention, in the chrominance signal demodulation apparatus according to the first aspect, the arithmetic unit comprises: a 1H delay unit for delaying the multiplexed signal outputted from the chrominance signal multiplexing unit by one cycle of the horizontal sync signal; a phase axis rotation unit for rotating, by 45 degrees, the phase axis of the multiplexed signal outputted from the chrominance signal multiplexing unit and the phase axis of the multiplexed signal that is delayed by the 1H delay unit; and a correlation calculation unit for calculating correlation between the multiplexed signal outputted from the chrominance signal multiplexing unit, and the multiplexed signal outputted from the 1H delay unit, the phase axes of which are rotated by the phase axis rotation unit. Therefore, it is possible to realize demodulation of a PAL system signal the phase axis of which is inclined by 45 degrees with respect to the phase axis of an NTSC system signal.

According to a fourth aspect of the present invention, in the chrominance signal demodulation apparatus according to the third aspect, the phase axis rotation unit comprises: a first 1T delay unit for delaying the multiplexed signal outputted from the chrominance signal multiplexing unit and the multiplexed signal outputted from the 1H delay unit, by one cycle of the clock signal that is outputted from the loop filter to the chrominance signal multiplexing unit; a first addition unit for adding the multiplexed signal outputted from the chrominance signal multiplexing unit, and the multiplexed signal that is outputted from the chrominance signal multiplexing unit and delayed by the 1T delay unit; a first subtraction unit for performing subtraction between the multiplexed signal outputted from the chrominance signal multiplexing unit, and the multiplexed signal that is outputted from the chrominance signal multiplexing unit and delayed by the 1T delay unit; a second addition unit for adding the multiplexed signal outputted from the 1H delay unit, and the multiplexed signal that is outputted from the 1H delay unit and delayed by the 1T delay unit; and a second subtraction unit for performing subtraction between the multiplexed signal outputted from the 1H delay unit, and the multiplexed signal that is outputted from the 1H delay unit and delayed by the 1T delay unit; and the correlation calculation unit comprises: a third subtraction unit for performing subtraction between the output signal from the first addition unit, and the output signal from the second addition unit; and a third addition unit for adding the output signal from the first subtraction unit, and the output signal from the second subtraction unit. Therefore, it is possible to realize demodulation of a PAL system signal the phase axis of which is inclined by 45 degrees with respect to the phase axis of an NTSC system signal, by a simple construction using no multiplier.

According to a fifth aspect of the present invention, in the chrominance signal demodulation apparatus according to the first aspect, the arithmetic unit comprises: a phase axis rotation unit for rotating, by 45 degrees, the phase axis of the multiplexed signal outputted from the chrominance signal multiplexing unit; a 1H delay unit for delaying the multiplexed signal outputted from the phase axis rotation unit by one cycle of the horizontal sync signal; and a correlation calculation unit for calculating correlation between the multiplexed signal outputted from the phase axis rotation unit and the multiplexed signal outputted from the 1H delay unit. Therefore, it is possible to realize demodulation of a PAL system signal the phase axis of which is inclined by 45 degrees with respect to the phase axis of an NTSC system signal.

According to a sixth aspect of the present invention, in the chrominance signal demodulation apparatus according to the fifth aspect, the phase axis rotation unit comprises: a first 1T delay unit for delaying the multiplexed signal outputted from the chrominance signal multiplexing unit by one cycle of the clock signal that is outputted from the loop filter to the chrominance signal multiplexing unit; a first addition unit for adding the multiplexed signal outputted from the chrominance signal multiplexing unit, and the multiplexed signal outputted from the chrominance signal multiplexing unit and delayed by the 1T delay unit; and a first subtraction unit for performing subtraction between the multiplexed signal outputted from the chrominance signal multiplexing unit, and the multiplexed signal that is outputted from the chrominance signal multiplexing unit and delayed by the 1T delay unit; the 1H delay unit delays the output signals from the first addition unit and the first subtraction unit each by one cycle of the horizontal sync signal; and the correlation calculation unit comprises: a third subtraction unit for performing subtraction-between the output signal from the first addition unit, and the signal which is delayed by the 1H delay unit and outputted from the first addition unit; and a third addition unit for adding the output signal from the first subtraction unit, and the signal which is delayed by the 1H delay unit and outputted from the first subtraction unit. Therefore, it is possible to realize demodulation of a PAL system signal the phase axis of which is inclined by 45 degrees with respect to the phase axis of an NTSC system signal, by a simple construction using no multiplier.

According to a seventh aspect of the present invention, the chrominance signal demodulation apparatus according to any of the third to fifth aspects further comprises: a first line ident detection unit for detecting a line ident signal from the signal which is obtained by rotating the phase axis of the multiplexed signal outputted from the chrominance signal multiplexing unit, the line ident signal indicating the polarity of the R-Y component signal of the PAL system signal; and a second line ident detection unit for detecting a line ident signal from the signal outputted from the correlation calculation unit, the line ident signal indicating the polarity of the R-Y component signal of the PAL system signal; wherein the loop filter selectively outputs a clock signal synchronized with the burst signal and a clock signal that is delayed by 90 degrees with respect to the clock signal synchronized with the burst signal, on the basis of the signal indicating the polarity of the R-Y component signal of the PAL system signal, which is outputted from the first line ident detection unit; and the R-Y inversion unit selectively changes the polarity of the R-Y component signal of the signal outputted from the correlation calculation unit, on the basis of the signal indicating the polarity of the R-Y signal component of the PAL system signal, which is outputted from the second line ident detection unit. Therefore, the first line ident detection circuit can detect a line ident signal without being affected by the output signal from the 1H delay circuit, whereby the line ident signal can be detected with stability from the first line ident detection circuit even under severe deterioration conditions such as weak electric field or level compression of the burst signal.

According to an eighth aspect of the present invention, in the chrominance signal demodulation apparatus according to the seventh aspect, the second line ident detection unit comprises: a sign detection unit for detecting the polarity of the R-Y component signal of the PAL system signal from the signal outputted from the correlation calculation unit, and outputting a signal indicating the detected polarity; a protection line ident signal generation unit which is provided with a signal generator for outputting a signal that is generated so as to indicate different polarities at every timing when the horizontal sync signal is inputted, and inverts the generated signal when a control signal instructing inversion of the signal is supplied from the inversion control unit; a matching judgement unit for judging, at the cycle of the horizontal sync signal, as to whether the polarity indicated by the signal outputted from the sign detection unit matches the polarity indicated by the signal outputted from the protection line ident signal generation unit or not; the inversion control unit for outputting a control signal that instructs the protection line ident signal generation unit to perform inversion of signal when the number of mismatches between the polarity indicated by the signal outputted from the sign detection unit and the polarity indicated by the signal outputted from the protection line ident signal generation unit reaches a predetermined number of times; and an output terminal for outputting the output signal from the protection line ident signal generation unit, as a line ident signal. Therefore, it is possible to detect a line ident signal with stability even when a PAL system signal is received, whereby stable demodulation can be realized without causing chrominance horizontal noise or the like on a screen of a television receiver or the like even in an adverse environment such as weak electric field.

According to a ninth aspect of the present invention, in the chrominance signal demodulation apparatus according to the eighth aspect, the second line ident detection unit further includes an inversion function stop unit for counting the number of horizontal sync signals inputted between vertical sync signals, and disabling the control signal outputted from the inversion control unit until the count value exceeds a predetermined value. Therefore, it is possible to operate the second line ident detection circuit at a timing excluding influence of a copy guard pulse.

According to a tenth aspect of the present invention, the chrominance signal demodulation apparatus according to the first aspect further comprises a second line ident detection unit indicating the polarity of the R-Y component signal of the PAL system signal to the R-Y inversion unit; and the second line ident detection unit comprises: a sign detection unit for detecting the polarity of the R-Y component signal of the PAL system signal from the signal outputted from the correlation calculation unit, and outputting a signal indicating the detected polarity; a protection line ident signal generation unit which is provided with a signal generator for outputting a signal that is generated so as to indicate different polarities at every timing when the horizontal sync signal is inputted, and inverts the generated signal when a control signal instructing inversion of the signal is supplied from the inversion control unit; a matching judgement unit for judging, at the cycle of the horizontal sync signal, as to whether the polarity indicated by the signal outputted from the sign detection unit matches the polarity indicated by the signal outputted from the protection line ident signal generation unit or not; the inversion control unit for outputting a control signal that instructs the protection line ident signal generation unit to perform inversion of signal when the number of mismatches between the polarity indicated by the signal outputted from the sign detection unit and the polarity indicated by the signal outputted from the protection line ident signal generation unit reaches a predetermined number of times; and an output terminal for outputting the output signal from the protection line ident signal generation unit, as a line ident signal. Therefore, it is possible to detect a line ident signal with stability even when a PAL system signal is received, whereby stable demodulation can be realized without causing chrominance horizontal noise or the like on a screen of a television receiver or the like even under severe deterioration conditions such as weak electric field.

According to an eleventh aspect of the present invention, in the chrominance signal demodulation apparatus according to the tenth aspect, the second line ident detection unit further includes an inversion function stop unit for counting the number of horizontal sync signals inputted between vertical sync signals, and disabling the control signal outputted from the inversion control unit until the count value exceeds a predetermined value. Therefore, it is possible to operate the second line ident detection circuit at a timing excluding influence of a copy guard pulse.

DETAILED DESCRIPTION OF THE PREFERRED EMBODIMENTS

Embodiment 1

A chrominance signal demodulation apparatus according to a first embodiment of the present invention carries out demodulation of a PAL system chrominance signal as well as an NTSC system chrominance signal using the conventional chrominance signal demodulation apparatus shown in FIG. 5.

Figure 1:
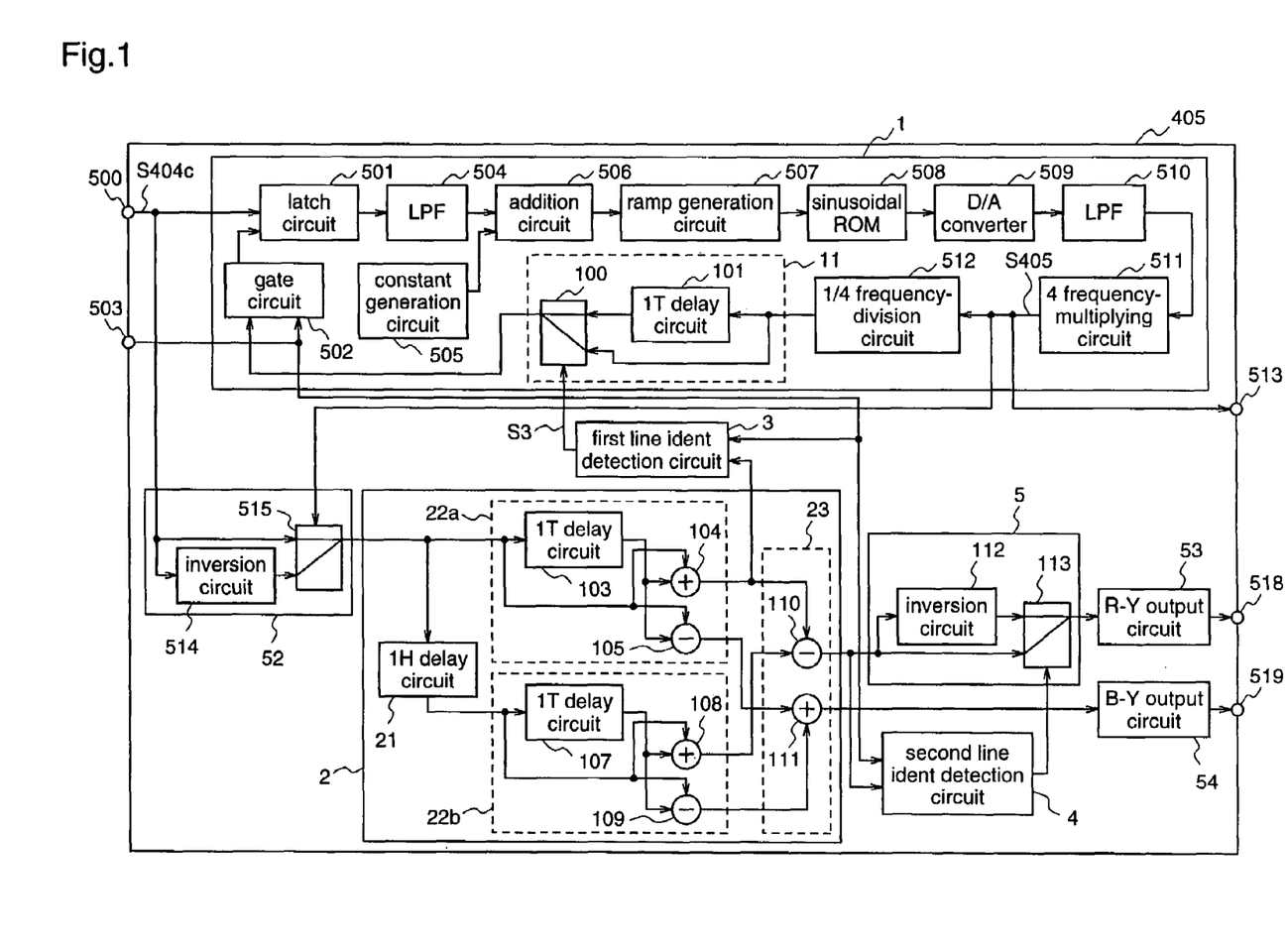
FIG. 1 is a block diagram illustrating an example of a chrominance signal demodulation apparatus according to a first embodiment of the present invention.
Figure 8:
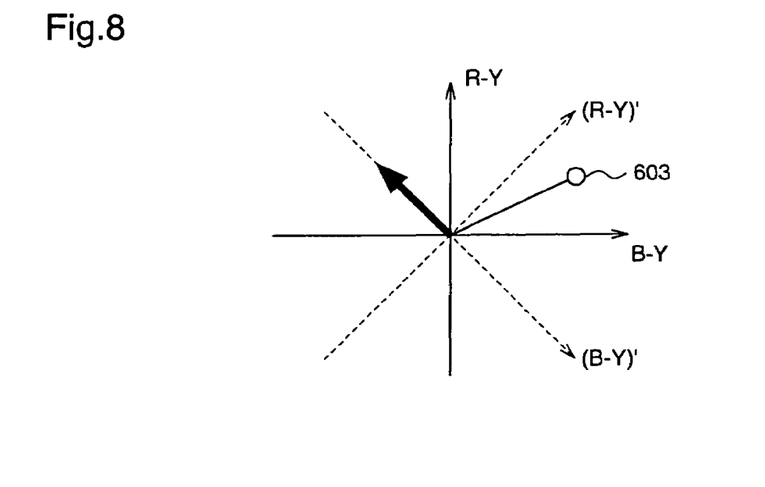
FIG. 8 is a diagram illustrating the state where the burst signal is shifted in the positive direction in the PAL system.

FIG. 1 is a block diagram illustrating the construction of the chrominance signal demodulation apparatus according to the first embodiment. FIG. 6 is a diagram illustrating the phase of an NTSC system burst signal, and FIGS. 7 and 8 are diagrams illustrating the phase of a PAL system burst signal.

With reference to FIG. 1, the chrominance signal demodulation apparatus according to the first embodiment comprises a chrominance component signal input terminal 500, a burst gate pulse input terminal 503, a loop filter 1, a chrominance signal multiplexing circuit 52, an arithmetic circuit 2, a first line ident detection circuit 3, a second line ident detection circuit 4, an R-Y inverter circuit 5, an R-Y output circuit 53, a B-Y output circuit 54, a 4FSC clock output terminal 513, an R-Y signal output terminal 518, and a B-Y signal output terminal 519. In FIG. 1, the same constituents as those of the conventional chrominance signal demodulation apparatus shown in FIG. 5 are given the same reference numerals, and therefore, repeated description is not necessary.

The loop filter 1 is obtained by adding, to the loop filter 51 shown in FIG. 5, a clock timing change circuit 11 which selectively outputs a clock signal synchronized with a burst signal, and a clock signal that is delayed by 90° with respect to the phase of the clock signal, on the basis of the polarity of an R-Y component signal of a PAL system signal.

According to whether the clock timing change circuit 11 is operated or not, the loop filter 1 is able to generate a clock signal that is synchronized with the burst signal having a frequency N times as high as that of the burst signal (N: integer not less than 2), and a clock signal that is obtained by shifting the clock signal by 90° for every line of the PAL system signal.

Hereinafter, the clock timing change circuit 11 included in the loop filter 1 will be described in more detail.

The clock timing change circuit 11 comprises a selector 100 and an 1T delay circuit 101.

The selector 100 selects and outputs either the output of the 1T delay circuit 101 or the output of the ¼ frequency division circuit 512 on the basis of the output S3 of the first line ident detection circuit 3.

The 1T delay circuit 101 delays one output of the clock having the same frequency as the burst signal outputted from the ¼ frequency division circuit 512, thereby to delay the phase of the burst signal outputted from the ¼ frequency division circuit 512 by 90°.

The first line ident detection circuit 3 detects as to whether the polarity of the R-Y component signal of the PAL system signal is positive as shown by 601 in FIG. 7 or negative as shown by 602 in FIG. 7.

In this first embodiment, the first line ident detection circuit 3 receives the R-Y axis component signal which is outputted from an addition circuit 104 and whose phase axis is rotated by a first phase axis rotation circuit 22*a* described later, and a burst gate pulse input which is supplied from the burst gate pulse input terminal 503, and judges whether the R-Y axis component signal outputted from the addition circuit 104 is positive or negative, during a period when the burst gate pulse supplied from the burst gate pulse input terminal 503 is enable, i.e., during a period when the burst signal exists, and holds the value when the burst gate pulse is disabled. The first line ident detection circuit 3 outputs a flag S3 indicating the detected polarity of the R-Y component signal of the burst signal to the selector 100. The flag indicating the phase direction is generally called a PAL line ident signal.

The line ident signal to be output from the first line ident detection circuit 3 may be calculated using not only the output from the addition circuit 104 but also the output from an addition circuit 108 of a second phase axis rotation circuit 22*b* or the output from a subtraction circuit 110 of a correlation calculation circuit 32. However, it is impossible to achieve sufficient characteristics under adverse conditions such as weak electric field or level compression of the burst signal unless the line ident signal that is detected for burst lock is taken from the output of the addition circuit 104. The reason is as follows. When the first line ident information is obtained from the output of the addition circuit 108 of the second phase axis rotation circuit 22*b*, a stationary phase error might occur because a result that is delayed by one cycle of the horizontal sync signal by the 1H delay circuit 21 is used for loop control for burst lock. Further, also when burst lock is made using the output from the subtraction circuit 110 of the correlation calculation circuit 32, the output from the subtraction circuit 110 of the correlation calculation circuit 32 is affected by the output from the addition circuit 108 of the second phase axis rotation circuit 22*b*, whereby a stationary phase error might occur like in the case where the output from the addition circuit 108 of the second phase axis rotation circuit 22*b* is used, leading to a reduction in burst lock performance.

By the way, the conventional chrominance signal demodulation apparatus described with reference to FIG. 5 employs a loop filter in which an input signal travels from the flip-flop group 501 through the 4 frequency multiplying circuit 511 and finally returns to the load hold input of the flip-flop group 501. Therefore, the burst clock signal S405 becomes a clock that keeps the horizontal phase with respect to the burst signal as shown in FIG. 6 in the NTSC system. On the other hand, in the PAL system, the burst clock signal S405 becomes a-clock the phase of which is shifted by 90° for every line of the burst signal as shown in FIG. 7.

The chrominance signal demodulation apparatus according to the first embodiment is provided with the clock timing change circuit 11 comprising the selector 100 and the 1T delay circuit 101 as described above. When the apparatus receives a PAL system signal, the selector 100 selects either the signal synchronized with the burst signal, which is output from the ¼ frequency division circuit 512, or the signal that is delayed by 90° with respect to the phase of the burst signal, which is output from the 1T delay circuit 101, on the basis of the flag S3 indicating the polarity of the R-Y component signal of the burst signal, which is output from the first line ident detection circuit 3.

Thereby, the loop filter 1 can perform burst lock while maintaining stable pull-in characteristics of the PAL system signal with the phase of the burst signal being shifted by 90° for every line.

Since the constituents of the loop filter 1, i.e., a gate circuit 502, an LPF 504, a constant generation circuit 505, an addition circuit 506, a ramp generation circuit 507, a sinusoidal ROM 508, a D/A converter 509, an LPF 510, a 4 frequency multiplying circuit 511, and a ¼ frequency division circuit 512 are identical to those described with respect to FIG. 5, repeated description is not necessary.

When the phase of the burst signal is shifted by 90° for every line using the selector 100 and the 1T delay circuit 101 of the loop filter 1, the inputted chrominance component signal S404c is burst locked in such a manner that the R-Y axis and the B-Y axis are rotated by only 45° as shown in FIG. 8.

That is, as shown in FIG. 8, when the chrominance component signal S404c comprising a specific chrominance signal vector 603 is inputted, it can be considered that the chrominance component signal S404c is demodulated such that the R-Y axis and the B-Y axis are shifted by 45° to be the (R-Y)' axis and the (B-Y)' axis, respectively. Therefore, demodulation of the PAL system signal can be carried out by returning the axes to the original positions.

Hereinafter, the process of demodulating the PAL system signal will be described in more detail.

The arithmetic circuit 2 rotates, by 45°, the phase axis of the multiplexed signal outputted from the chrominance signal multiplexing circuit 52, and calculates correlation between the multiplexed signal and the 1H delay signal which is obtained by delaying the multiplexed signal by one cycle of the horizontal sync signal. As shown in FIG. 1, the arithmetic circuit 2 comprises the 1H delay circuit 21, the first phase axis rotation circuit 22a, the second phase axis rotation circuit 22b, and the correlation calculation circuit 32.

The 1H delay circuit 106 delays the output of the selector 515 by a time corresponding to the horizontal sync period. It is usually implemented by a memory or the like.

The first phase axis rotation circuit 22a (the second phase axis rotation circuit 22b) rotates the phase axis of the input signal by 45°, and comprises a 1T delay circuit 103 (107), an addition circuit 104 (108), and a subtraction circuit 105 (109).

The correlation calculation circuit 32 performs correlation calculation over two cycles of the horizontal sync signal, which is required when demodulating the PAL system signal, and comprises a subtraction circuit 110 and an addition circuit 111.

Next, the specific processing to be performed by the arithmetic circuit 2 will be described in detail.

When the NTSC system signal is input to the arithmetic circuit 2, as described for the conventional apparatus, the R-Y component signal (hereinafter referred to as "V signal") and the B-Y component signal (hereinafter referred to as "U signal") are alternately multiplexed and outputted from the selector 515 shown in FIG. 1. On the other hand, when the PAL system signal is input to the arithmetic circuit 2, a V' signal which is phase-shifted by 45° relative to the original V signal and a U' signal which is phase-shifted by 45° relative to the original U signal are alternately multiplexed and outputted as shown in FIG. 8. Therefore, when the arithmetic circuit 2 receives the PAL system signal, the arithmetic circuit 2 performs demodulation with the phase axis being rotated by 45° to be restored to the original axis.

Generally, rotation of the phase axis by 45° can be realized by carrying out the arithmetic operations shown by formulae (2) and (3).

$$U=\cos(\pi/4)*U'-\sin(\pi/4)*V'=K(U'-V') \quad (2)$$

$$V=\sin(\pi/4)*U'+\cos(\pi/4)*V'=K(U'+V') \quad (3)$$

wherein $K=2/\sqrt{2}$.

The arithmetic operations expressed by formulae (2) and (3) are implemented as follows by the 1T delay circuits 103 and 107, the addition circuits 104 and 108, and the subtraction circuits 105 and 109 which are constituents of the first phase axis rotation circuit 22a and the second phase axis rotation circuit 22b, respectively.

First of all, a description will be given of the operations of the 1T delay circuit 103, the addition circuit 104, and the subtraction circuit 105, which are components of the first phase axis rotation circuit 22a.

The 1T delay circuit 103 delays an input signal by one cycle of the clock signal which is used when alternately outputting the U' signal and the V' signal by the chrominance signal multiplexing circuit 52 comprising the inverter circuit 514 and the selector 515. In this first embodiment, the 1T delay circuit 103 delays the input signal by one cycle of the 4fsc clock signal having a frequency four times as high as that of the burst signal.

The addition circuit 104 performs addition of the output from the selector 515 and the output from the 1T delay circuit 103, and an operation of (U'+V') is realized by the addition circuit 104. Further, the subtraction circuit 105 performs subtraction between the output from the selector 515 and the output from the 1T delay circuit 103, and an operation of (U'-V') is realized by the subtraction circuit 105.

Thereby, the first phase axis rotation circuit 22a can perform the arithmetic operations expressed by formulae (2) and (3). When formulae (2) and (3) are compared with FIG. 1, there is no circuit construction for K multiplication which corresponds to formulae (2) and (3). The reason is as follows. In the case of the PAL system signal, since burst lock is carried out with the chrominance component signal S404c being inclined by 45° with respect to the R-Y axis and the B-Y axis, and therefore, $\cos(\pi/4)=\sin(\pi/4)=\sqrt{}/2$ holds, whereby the output signal from the selector 515 has already been compressed to the $\sqrt{2}/2$ level.

The operations of the 1T delay circuit 107, the addition circuit 108, and the subtraction circuit 109 constituting the second phase axis rotation circuit 22b are identical to the operations of the 1T delay circuit 103, the addition circuit 104, and the subtraction circuit 105 constituting the first phase axis rotation circuit 22a, except that the 1H delay circuit component of the 1H delay circuit 106 is subjected to the arithmetic operations expressed by formulae (2) and (3).

The reason is as follows. In order to demodulate the PAL system signal, correlation calculation over two cycles of the horizontal sync signal is required, and the correlation calculation over two cycles of the horizontal sync signal is carried out by the subtraction circuit 110 and the addition circuit 111 constituting the correlation calculation circuit 32.

In the above-mentioned construction, after the arithmetic operations expressed by formulae (2) and (3) have been completed and the correlation calculation has been carried out, the U signal, i.e., the B-Y component signal, is output from the addition circuit 111, and the V signal, i.e., the R-Y component signal is output from the subtraction circuit 110.

The polarity of the V signal outputted from the subtraction circuit 110 is inverted for every line due to the burst signal which is inverted for every line. Therefore, the R-Y inverter circuit 5 comprising the inverter circuit 112 and the selector 113 is provided, and the R-Y inverter circuit 5 judges whether the amplitude polarity of the V signal outputted from the subtraction circuit 110 should be inverted or not, on the basis of the result outputted from the second line ident detection circuit 4, and performs inversion of the amplitude polarity of the V signal as required.

The second line ident detection circuit 4 detects whether the polarity of the R-Y component signal of the PAL system signal is positive as shown by 601 in FIG. 7 or negative as shown by 602 in FIG. 7.

In this first embodiment, the second line ident detection circuit 4 judges whether the output from the subtraction circuit 110 is positive or negative during the burst signal period, and outputs the result as the second line ident detection information. Thereby, the second line ident detection circuit 4 instructs the selector circuit 113 to select the output from the inverter circuit 112 when the R-Y signal outputted from the subtraction circuit 110 is inverted, or instructs the selector circuit 113 to select the non-inverted signal as an output when the R-Y signal is not inverted.

Next, the R-Y signal outputted from the selector 113 is transmitted through the R-Y output circuit 53 and output to the outside of the chrominance signal demodulation apparatus 405 from the R-Y signal output terminal 518. The B-Y signal outputted from the addition circuit 111 is transmitted through the B-Y output circuit 54 to the outside of the chrominance signal demodulation apparatus 405 from the B-Y signal output terminal 519.

As described above, the chrominance signal demodulation apparatus according to the first embodiment includes the clock timing change circuit 11 for burst-locking the chrominance component signal S404c with the phase of the burst signal being shifted by 90° for every line, and the phase axis rotation circuits 22a and 22b for performing phase axis rotation operations, thereby to enable conversion of the phase axis of the burst signal. Therefore, demodulation of the PAL system chrominance signal can be carried out using the conventional chrominance signal demodulation apparatus shown in FIG. 5. Further, in this construction, the selector circuit 100 is controlled by the output of the first line ident detection circuit 3 so that the selector circuit 100 always selects the path that bypasses the 1T delay circuit 101 of the clock timing change circuit 11, and the output from the selector circuit 515 is directly output to the R-Y output circuit 53 and the B-Y output circuit 54. Thereby, the circuit construction becomes identical to that of the chrominance signal demodulation apparatus 405 shown in FIG. 5 which is suited for receiving the NTSC system video signal, and demodulation of the chrominance signal can be carried out using the common device regardless of the broadcasting systems such as NTSC and PAL, resulting in a reduction in the circuit scale of the chrominance signal demodulation apparatus.

According to the first embodiment, in the arithmetic circuit 2, after the 1H delay signal is generated by the 1H delay circuit 21, the phase axis rotation circuits 22a and 22b perform the phase axis rotation operations on the output from the chrominance signal multiplexing circuit 52 and the output from the 1H delay circuit 21, and then the correlation calculation circuit 32 calculates correlation between these signals. However, the construction of the arithmetic circuit 2 is not restricted thereto. For example, after the phase axis rotation circuit has performed the phase axis rotation operation on the output from the chrominance signal multiplexing circuit 52, the 1H delay circuit 21 may generate the 1H delay signal, and then the correlation calculation circuit 32 may calculate correlation between the output from the phase axis rotation circuit and the output from the 1H delay circuit 21. Since, in this case, only one phase axis rotation circuit is required, the circuit scale is further reduced.

Embodiment 2

Next, another construction of the second line ident detection circuit 4 of the chrominance signal demodulation apparatus according to the first embodiment will be described as a second embodiment of the present invention.

Figure 2:
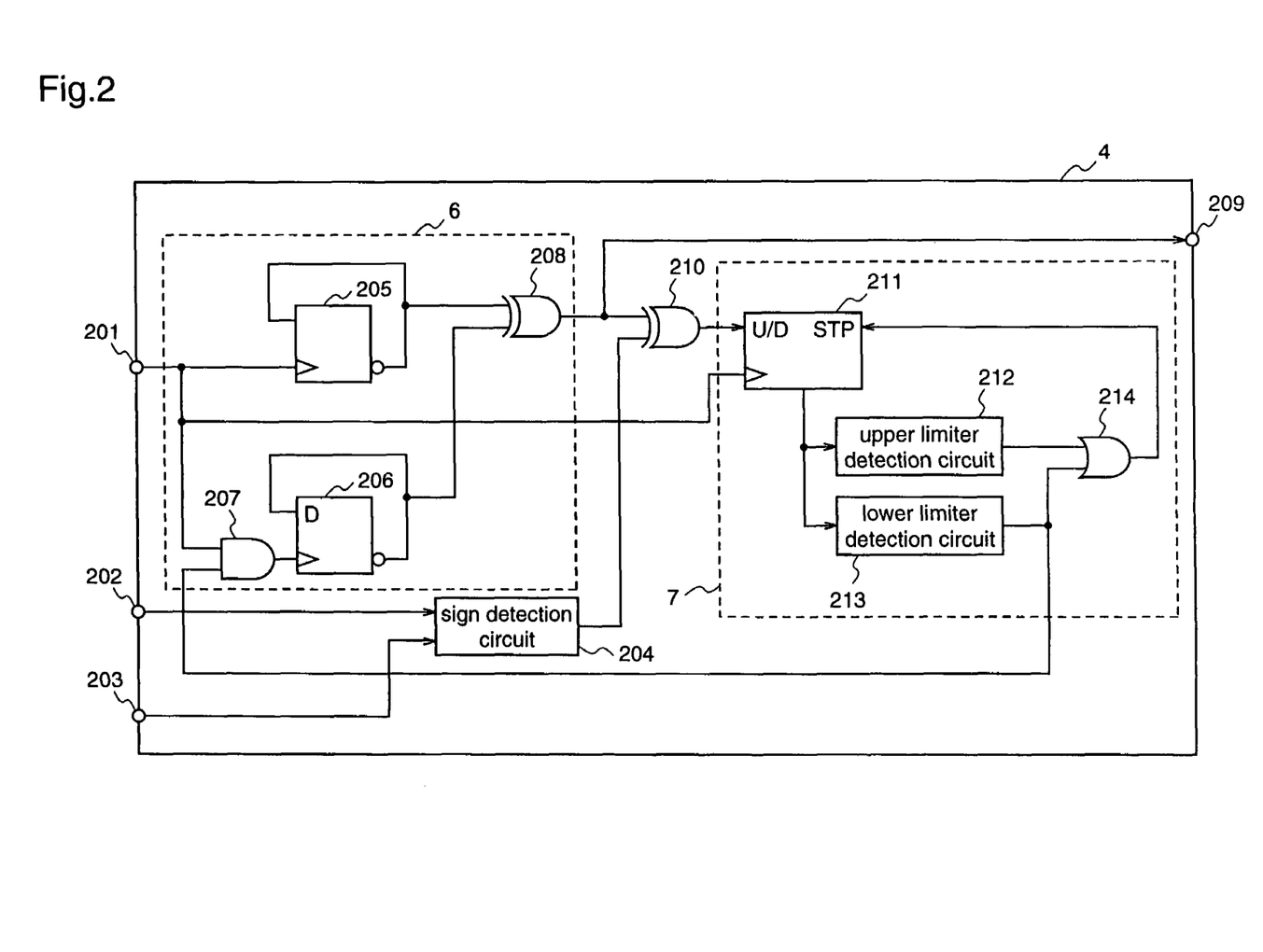
FIG. 2 is a block diagram illustrating an example of a second line ident detection circuit included in the chrominance signal demodulation apparatus according to a second embodiment of the present invention.

FIG. 2 is a block diagram illustrating an example of the construction of the second line ident detection circuit 4 of the chrominance signal demodulation apparatus according to the second embodiment.

With reference to FIG. 2, the second line ident detection circuit 4 comprises a horizontal sync signal input terminal 201, an R-Y component signal input terminal 202, a burst gate pulse input terminal 203, a sign detection circuit 204, a protection line ident signal generation circuit 6, an EOR gate 210 operating as a matching judgement circuit, an inversion control circuit 7, and a line ident signal output terminal 209. A horizontal sync signal is input to the horizontal sync signal input terminal 201, and the output of the subtraction circuit 110 shown in FIG. 1 is input to the R-Y component signal input terminal 202, and further, a burst gate pulse signal outputted from the burst gate pulse input terminal 503 is input to the burst gate pulse input terminal 203.

The sign detection circuit 204 operates as a line ident detection circuit, and judges whether the signal inputted to the R-Y component signal input terminal 202 is positive or negative during a period when the burst gate pulse inputted through the burst gate pulse input terminal 203 is enable, that is, during a period when the burst signal exists. When the burst gate pulse is disabled, the sign detection circuit 204 holds that value. Since, in the above-mentioned construction, the R-Y axis component of the burst signal is input through the R-Y component signal input terminal 202, the line ident information indicating the orientation (positive or negative) of the vector of the burst signal is consequently output from the sign detection circuit 204 during the period when the burst signal exits.

However, the line ident information that is generated using the output from the arithmetic circuit 2 shown in FIG. 1 might be incorrectly detected under adverse conditions such as weak electric field or level compression of the burst signal, resulting in chrominance horizontal noise that appears on the screen of the television receiver. Therefore, the line ident detection circuit 4 of the chrominance signal demodulation apparatus according to the second embodiment further includes the protection line ident signal generation circuit 6, the EOR gate 210, and the inversion control circuit 5.

The protection line ident signal generation circuit 6 outputs signals having different polarities at every timing when the horizontal sync signal is input to the horizontal sync signal input terminal 201, on the basis of the control signal outputted from the inversion control circuit 7.

The protection line ident signal generation circuit 6 comprises, for example, a flip-flop 205, a flip-flop 206, a logic gate 207, and an EOR gate 208.

The flip-flop 205 is a toggle type flip-flop, and functions as a signal generation circuit that repeats inversion every time the horizontal sync signal is input to the horizontal sync signal input terminal 201. Further, the flip-flop 206 is a toggle type flip-flop that performs inversion at the timing when the control signal from the inversion control circuit 7 is input to the logic gate 207.

The EOR gate 208 receives the output signal from the flip-flop 205 and the output signal from the flip-flop 206, and outputs a signal that repeats inversion every time the horizontal sync signal is input, which inversion is controlled by the control signal from the inversion control circuit 7. The signal generated by the protection line ident signal generation circuit 5 is output as a line ident signal through the line ident signal output terminal 209.

The EOR gate 210 is a matching judgement circuit for judging as to whether the signal outputted from the sign detection circuit 204 matches the signal outputted from the EOR gate 208 or not at the cycle of the horizontal sync signal. The EOR gate 210 outputs "0" when the signal outputted from the sign detection circuit 204 matches the signal outputted from the EOR gate 208, and outputs "1" when the signal outputted from the sign detection circuit 204 does not match the signal outputted from the EOR gate 208.

The inversion control circuit 7 outputs a control signal that instructs the protection line ident signal generation circuit 6 to invert the signal, when the number of mismatches between the signal outputted from the sign detection circuit 204 and the signal outputted from the EOR gate 208 exceeds a predetermined number of times.

The inversion control circuit 7 comprises, for example, an up/down counter 211, an upper limit detection circuit 212, a lower limit detection circuit 213, and a logic gate 214.

The up/down counter 211 receives the output from the EOR gate 210 as a matching judgement circuit, and cumulatively increases the number of occurrences of matches every time the output from the EOR gate 210 indicates "match", at the cycle of the horizontal sync signal. Conversely, it decreases the cumulative number every time the output of the EOR gate 210 indicates "mismatch". In this second embodiment, since "0" is output when the signal outputted from the sign detection circuit 204 matches the signal outputted from the EOR gate 208 while "1" is output when these signals do not match, up count is carried out when the output from the EOR gate 21 is "0" while down count is carried out when it is "1".

The upper limit detection circuit 212 and the lower limit detection circuit 213 output a signal when the count of the up/down counter 211 exceeds a predetermined threshold value.

More specifically, when matching between the signal outputted from the sign detection circuit 204 and the signal outputted from the EOR gate 208 continues and thereby the count of the up/down counter 211 exceeds the threshold value that is previously set on the upper limit detection circuit 212, a control signal is output from the upper limit detection circuit 212. On receipt of the control signal through the logic gate 214, the up/down counter 211 stops the up count at the predetermined threshold value that is set on the upper limit detection circuit 212.

On the other hand, when mismatching between the signal outputted from the sign detection circuit 204 and the signal outputted from the EOR gate 208 continues and thereby the count of the up/down counter 211 exceeds the threshold value that is previously set on the lower limit detection circuit 213, a control signal is output from the lower limit detection circuit 213. On receipt of the control signal through the logic gate 214, the up/down counter 211 stops the down count at the predetermined threshold value that is set on the lower limit detection circuit 213. Further, the control signal is output to the logic gate 207 as a control signal for instructing inversion of the signal outputted from the protection line ident signal generation circuit 6.

The inversion control circuit 7 thus constructed controls inversion of the signal outputted from the protection line ident signal generation circuit 6 so that the signal outputted from the sign detection circuit 204 matches the signal outputted from the EOR gate 208. Therefore, it is possible to supply the line ident signal that reliably matches the line ident signal detected by the sign detection circuit 204.

The operation under adverse conditions such as weak electric field or level compression of the burst signal will be described in detail. For example, when the detected line ident signal is normal for every cycle of the horizontal sync signal, the line ident signal should be input like 0, 1, 0, 1, 0, . . . However, under adverse conditions such as weak electric field or level compression of the burst signal, it might become an incorrect signal at a certain timing, like 0, 1, 0, 0, 0, . . . However, according to the second line ident detection circuit 4 of the second embodiment, since the signal outputted from the protection line ident signal generation circuit 5 repeats alternation at the cycle of the horizontal sync signal, even when an incorrect signal occurs at some timing, the original line ident signal is reliably output from the line ident signal output terminal 209. It is confirmed in an actual experiment under a weak electric field that the performance is improved by 12 dBμ after insertion of the second line ident detection circuit 4.

As described above, the chrominance signal demodulation apparatus according to the second embodiment of the invention is provided with the second line ident detection circuit 4 shown in FIG. 2 to detect the orientation of the phase of the burst signal, and correction is carried out as required. Therefore, the line ident signal can always be detected with stability even when receiving the PAL system signal, resulting in stable demodulation without occurrence of chrominance horizontal noise or the like on the screen of the television receiver or the like.

Embodiment 3

Hereinafter, still another construction of the second line ident detection circuit 4 of the chrominance signal demodulation apparatus according to the first embodiment will be described as a third embodiment of the present invention.

Figure 3:
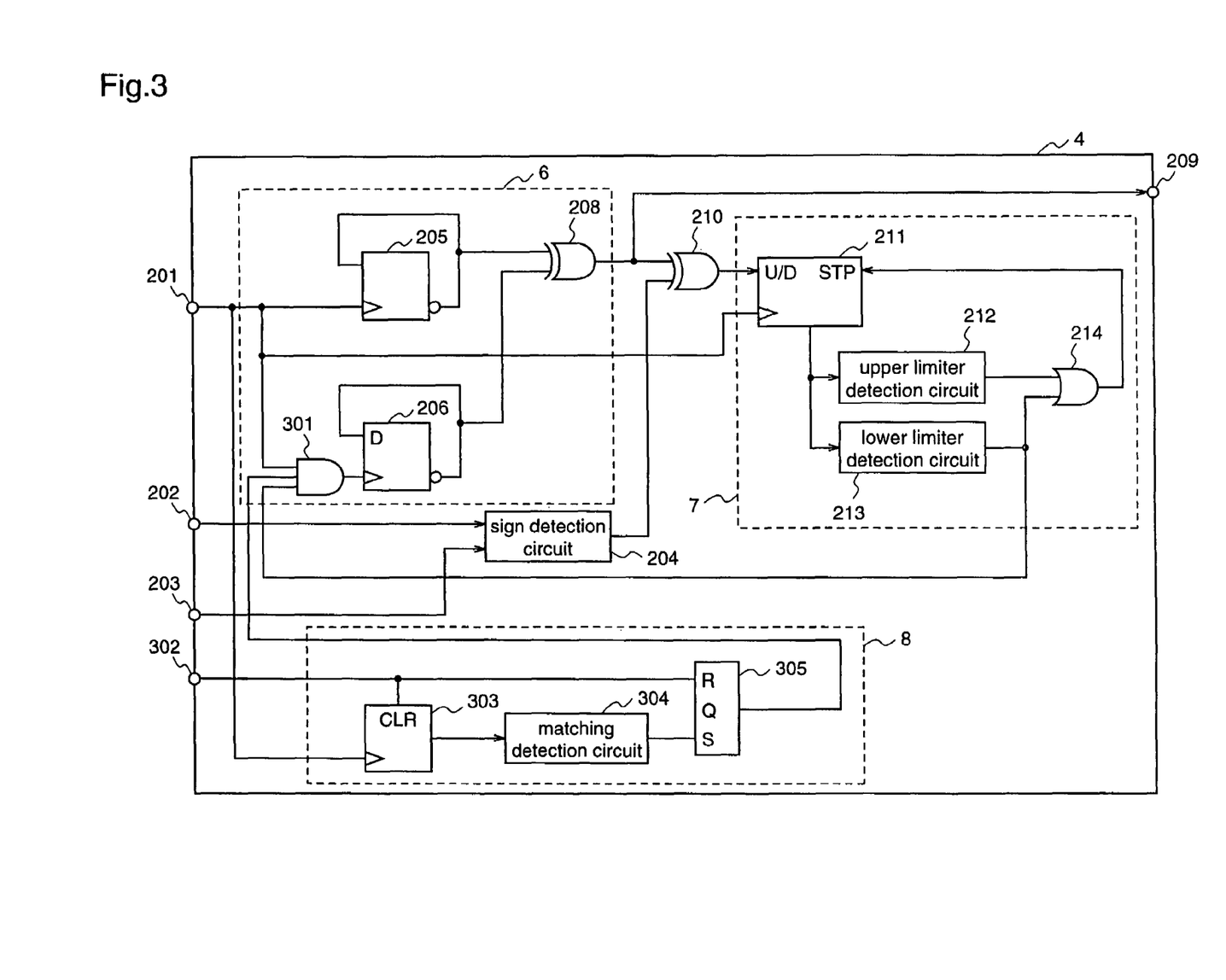
FIG. 3 is a block diagram illustrating another example of a second line ident detection circuit included in the chrominance signal demodulation apparatus according to a third embodiment of the present invention.

The second line ident detection circuit 4 of the chrominance signal demodulation apparatus according to the third embodiment especially takes a countermeasure against a problem caused by that a copy guard pulse is inserted in a vertical blanking period depending on media such as video decoders or DVD devices in recent years.

To be specific, although demodulation of a chrominance signal is carried out with reference to a burst signal, when the above-mentioned copy guard pulse is inserted, a sync separation circuit malfunctions, whereby the timing when the burst signal exists is supplied at an incorrect timing, leading to false detection of line ident information. Therefore, a countermeasure against this malfunction is needed, and the second line ident detection circuit 4 shown in FIG. 3 is constituted to provide the countermeasure.

With reference to FIG. 3, the second line ident detection circuit comprises a horizontal sync signal input terminal 201, an R-Y component signal input terminal 202, a burst gate pulse input terminal 203, a sign detection circuit 204, a protection line ident signal generation circuit 6, an EOR gate 210 operating as a matching judgement circuit, an inversion control circuit 7, a line ident signal output terminal 209, a vertical sync signal input terminal 302, and an inversion function stop circuit 8. The same constituents as those of the second line ident detection circuit 4 which has already been described with respect to the second embodiment using FIG. 2 are given the same reference numerals and, therefore, repeated description is not necessary.

The second line ident detection circuit 4 of the chrominance signal demodulation apparatus according to the third embodiment further includes the inversion function stop circuit 8 in addition to the constituents of the second line ident detection circuit 4 according to the second embodiment.

The inversion function stop circuit 8 counts the number of horizontal sync signals which are inputted between vertical sync signals, and disables the control signal outputted from the inversion control circuit 7 until the count exceeds a predetermined value.

The inversion function stop circuit 8 comprises, for example, a counter 303, a matching detection circuit 304, and an SR flip-flop 305 as shown in FIG. 3.

Hereinafter, the inversion function stop circuit 8 will be described in more detail with reference to FIG. 3.

In FIG. 3, the counter 303 is a multiple-bit counter that performs counting at the timing of the horizontal sync signal which is supplied from the horizontal sync signal input terminal 201. The count value is cleared at the timing when the vertical sync signal is input through the vertical sync signal input terminal 302.

The matching detection circuit 304 has a function of outputting a flag indicating "matching" when the value outputted from the counter matches a predetermined value. As for the predetermined value, a value from the timing when the vertical sync signal is input to the timing when the sync separation circuit is stabilized is set on the basis of the cycle of the horizontal sync signal.

When the SR flip-flop 305 receives a signal at an R input thereof, i.e., when the vertical sync signal is input to the SR flip-flop 305 through the vertical sync signal input terminal 302, it holds and outputs a low level. On the other hand, when the matching detection circuit 304 outputs a flag indicating "matching" and thereby an event occurs at an S input of the SR flip-flop 305, the SR flip-flop 305 is inverted to output a high level.

Therefore, at the timing just before inputting of the vertical sync signal when synchronization is easily disturbed due to a copy guard pulse or the like, the SR flip-flop 305 changes to a low level to close the logic gate 207, whereby the output from the lower limit detection circuit 213 of the inversion control circuit 6 is disabled. On the other hand, when the matching detection circuit 304 outputs a flag indicating that the count matches the predetermined value, the SR flip-flop changes to a high level to open the logic gate 207, whereby the output from the lower limit detection circuit 213 of the inversion control circuit 6 is enabled.

As described above, in the chrominance signal demodulation apparatus according to the third embodiment of the invention, the second line ident detection circuit 4 is provided with the inversion function, stop circuit 8 which counts the number of horizontal sync signals that are inputted between the vertical sync signals, and prevents the signal outputted from the protection line ident signal generation circuit from being inverted until the count value exceeds a predetermined value. Therefore, the second line ident detection circuit 4 can be operated at a timing excluding the influence of the copy guard pulse.

The present invention enables reception and demodulation of an NTSC system signal and a PAL system signal even under severe deterioration conditions such as weak electric field or level compression of a burst signal.

What is claimed is:

1. A chrominance signal demodulation apparatus comprising:

a loop filter including a clock timing change unit which selectively outputs a clock signal synchronized with a burst signal, and a clock signal that is delayed by 90 degrees with respect to the phase of the clock signal synchronized with the burst signal, from a chrominance component signal that is a quantized signal, on the basis of the polarity of an R-Y component signal of a PAL system signal, said loop filter generating a clock signal that is synchronized with the burst signal and has a frequency N times (N: integer not less than 2) as high as that of the burst signal;

a chrominance signal multiplexing unit for separating the chrominance component signal into an R-Y component signal and a B-Y component signal on the basis of the clock signal outputted from the loop filter, and outputting a signal that is obtained by alternately multiplexing the R-Y component signal and the B-Y component signal;

an arithmetic unit for rotating, by 45 degrees, the phase axis of the multiplexed signal outputted from the chrominance signal multiplexing unit, and calculating correlation between the multiplexed signal and a 1H delay signal that is obtained by delaying the multiplexed signal by one cycle of a horizontal sync signal;

an R-Y inversion unit for selectively changing the polarity of the R-Y component signal of the signal outputted from the arithmetic unit, on the basis of the polarity of the R-Y component signal of the PAL system signal;

an R-Y output unit for outputting the R-Y component signal outputted from the R-Y inversion unit; and a B-Y output unit for outputting the B-Y component signal of the signal outputted from the arithmetic unit.

2. A chrominance signal demodulation apparatus as defined in claim 1 wherein when the received signal is an NTSC system signal, the clock timing change unit included in the loop filter outputs only the clock signal synchronized with the burst signal, and the R-Y output unit and the B-Y output unit directly receive the multiplexed signal outputted from the chrominance signal multiplexing unit, and output the R-Y component signal and the B-Y component signal from the R-Y output unit and the B-Y output unit, respectively.

3. A chrominance signal demodulation apparatus as defined in claim 1 wherein said arithmetic unit comprises:

a 1H delay unit for delaying the multiplexed signal outputted from the chrominance signal multiplexing unit by one cycle of the horizontal sync signal;

a phase axis rotation unit for rotating, by 45 degrees, the phase axis of the multiplexed signal outputted from the chrominance signal multiplexing unit, and the phase axis of the multiplexed signal that is outputted from the chrominance signal multiplexing unit and delayed by the 1H delay unit; and a correlation calculation unit for calculating correlation between the multiplexed signal outputted from the chrominance signal multiplexing unit, and the multiplexed signal outputted from the 1H delay unit, the phase axes of which are rotated by the phase axis rotation unit.

4. A chrominance signal demodulation apparatus as defined in claim 3 wherein
said phase axis rotation unit comprises:
a first 1T delay unit for delaying the multiplexed signal outputted from the chrominance signal multiplexing unit and the multiplexed signal outputted from the 1H delay unit, by one cycle of the clock signal that is outputted from the loop filter to the chrominance signal multiplexing unit;
a first addition unit for adding the multiplexed signal outputted from the chrominance signal multiplexing unit, and the multiplexed signal that is outputted from the chrominance signal multiplexing unit and delayed by the 1T delay unit;
a first subtraction unit for performing subtraction between the multiplexed signal outputted from the chrominance signal multiplexing unit, and the multiplexed signal that is outputted from the chrominance signal multiplexing unit and delayed by the 1T delay unit;
a second addition unit for adding the multiplexed signal outputted from the 1H delay unit, and the multiplexed signal that is outputted from the 1H delay unit and delayed by the 1T delay unit; and
a second subtraction unit for performing subtraction between the multiplexed signal outputted from the 1H delay unit, and the multiplexed signal that is outputted from the 1H delay unit and delayed by the 1T delay unit; and
said correlation calculation unit comprises:
a third subtraction unit for performing subtraction between the output signal from the first addition unit, and the output signal from the second addition unit; and
a third addition unit for adding the output signal from the first subtraction unit, and the output signal from the second subtraction unit.

5. A chrominance signal demodulation apparatus as defined in claim 4 further comprising:
a first line ident detection unit for detecting a line ident signal from the signal which is obtained by rotating the phase axis of the multiplexed signal outputted from the chrominance signal multiplexing unit, said line ident signal indicating the polarity of the R-Y component signal of the PAL system signal; and
a second line ident detection unit for detecting a line ident signal from the signal outputted from the correlation calculation unit, said line ident signal indicating the polarity of the R-Y component signal of the PAL system signal;
wherein said loop filter selectively outputs a clock signal synchronized with the burst signal and a clock signal that is delayed by 90 degrees with respect to the clock signal synchronized with the burst signal, on the basis of the signal indicating the polarity of the R-Y component signal of the PAL system signal, which is outputted from the first line ident detection unit; and
said R-Y inversion unit selectively changes the polarity of the R-Y component signal of the signal outputted from the correlation calculation unit, on the basis of the signal indicating the polarity of the R-Y signal component of the PAL system signal, which is outputted from the second line ident detection unit.

6. A chrominance signal demodulation apparatus as defined in claim 3 further comprising:
a first line ident detection unit for detecting a line ident signal from the signal which is obtained by rotating the phase axis of the multiplexed signal outputted from the chrominance signal multiplexing unit, said line ident signal indicating the polarity of the R-Y component signal of the PAL system signal; and
a second line ident detection unit for detecting a line ident signal from the signal outputted from the correlation calculation unit, said line ident signal indicating the polarity of the R-Y component signal of the PAL system signal;
wherein said loop filter selectively outputs a clock signal synchronized with the burst signal and a clock signal that is delayed by 90 degrees with respect to the clock signal synchronized with the burst signal, on the basis of the signal indicating the polarity of the R-Y component signal of the PAL system signal, which is outputted from the first line ident detection unit; and
said R-Y inversion unit selectively changes the polarity of the R-Y component signal of the signal outputted from the correlation calculation unit, on the basis of the signal indicating the polarity of the R-Y signal component of the PAL system signal, which is outputted from the second line ident detection unit.

7. A chrominance signal demodulation apparatus as defined in claim 6 wherein
said second line ident detection unit comprises:
a sign detection unit for detecting the polarity of the R-Y component signal of the PAL system signal from the signal outputted from the correlation calculation unit, and outputting a signal indicating the detected polarity;
a protection line ident signal generation unit which is provided with a signal generator for outputting a signal that is generated so as to indicate different polarities at every timing when the horizontal sync signal is inputted, and inverts the generated signal when a control signal instructing inversion of the signal is supplied from the inversion control unit;
a matching judgement unit for judging, at the cycle of the horizontal sync signal, as to whether the polarity indicated by the signal outputted from the sign detection unit matches the polarity indicated by the signal outputted from the protection line ident signal generation unit or not;
said inversion control unit for outputting a control signal that instructs the protection line ident signal generation unit to perform inversion of signal when the number of mismatches between the polarity indicated by the signal outputted from the sign detection unit and the polarity indicated by the signal outputted from the protection line ident signal generation unit reaches a predetermined number of times; and
an output terminal for outputting the output signal from the protection line ident signal generation unit, as a line ident signal.

8. A chrominance signal demodulation apparatus as defined in claim 7 wherein said second line ident detection unit further includes an inversion function stop unit for counting the number of horizontal sync signals inputted between vertical sync signals, and disabling the control signal outputted from the inversion control unit until the count value exceeds a predetermined value.

9. A chrominance signal demodulation apparatus as defined in claim 1 wherein
said arithmetic unit comprises:
a phase axis rotation unit for rotating, by 45 degrees, the phase axis of the multiplexed signal outputted from the chrominance signal multiplexing unit;
a 1H delay unit for delaying the multiplexed signal outputted from the phase axis rotation unit by one cycle of the horizontal sync signal; and
a correlation calculation unit for calculating correlation between the multiplexed signal outputted from the phase axis rotation unit and the multiplexed signal outputted from the 1H delay unit.

10. A chrominance signal demodulation apparatus as defined in claim 9 wherein
said phase axis rotation unit comprises:
a first 1T delay unit for delaying the multiplexed signal outputted from the chrominance signal multiplexing unit by one cycle of the clock signal that is outputted from the loop filter to the chrominance signal multiplexing unit;
a first addition unit for adding the multiplexed signal outputted from the chrominance signal multiplexing unit, and the multiplexed signal outputted from the chrominance signal multiplexing unit and delayed by the 1T delay unit; and
a first subtraction unit for performing subtraction between the multiplexed signal outputted from the chrominance signal multiplexing unit, and the multiplexed signal that is outputted from the chrominance signal multiplexing unit and delayed by the 1T delay unit;
said 1H delay unit delays the output signals from the first addition unit and the first subtraction unit each by one cycle of the horizontal sync signal; and
said correlation calculation unit comprises:
a third subtraction unit for performing subtraction between the output signal from the first addition unit, and the signal which is delayed by the 1H delay unit and outputted from the first addition unit; and
a third addition unit for adding the output signal from the first subtraction unit, and the signal that is delay by the 1H delay unit and outputted from the first subtraction unit.

11. A chrominance signal demodulation apparatus as defined in claim 9 further comprising:
a first line ident detection unit for detecting a line ident signal from the signal which is obtained by rotating the phase axis of the multiplexed signal outputted from the chrominance signal multiplexing unit, said line ident signal indicating the polarity of the R-Y component signal of the PAL system signal; and
a second line ident detection unit for detecting a line ident signal from the signal outputted from the correlation calculation unit, said line ident signal indicating the polarity of the R-Y component signal of the PAL system signal;
wherein said loop filter selectively outputs a clock signal synchronized with the burst signal and a clock signal that is delayed by 90 degrees with respect to the clock signal synchronized with the burst signal, on the basis of the signal indicating the polarity of the R-Y component signal of the PAL system signal, which is outputted from the first line ident detection unit; and
said R-Y inversion unit selectively changes the polarity of the R-Y component signal of the signal outputted from the correlation calculation unit, on the basis of the signal indicating the polarity of the R-Y signal component of the PAL system signal, which is outputted from the second line ident detection unit.

12. A chrominance signal demodulation apparatus as defined in claim 1 further comprising a second line ident detection unit indicating the polarity of the R-Y component signal of the PAL system signal to the R-Y inversion unit; and
said second line ident detection unit comprises:
a sign detection unit for detecting the polarity of the R-Y component signal of the PAL system signal from the signal outputted from the correlation calculation unit, and outputting a signal indicating the detected polarity;
a protection line ident signal generation unit which is provided with a signal generator for outputting a signal that is generated so as to indicate different polarities at every timing when the horizontal sync signal is inputted, and inverts the generated signal when a control signal instructing inversion of the signal is supplied from the inversion control unit;
a matching judgement unit for judging, at the cycle of the horizontal sync signal, as to whether the polarity indicated by the signal outputted from the sign detection unit matches the polarity indicated by the signal outputted from the protection line ident signal generation unit or not;
said inversion control unit for outputting a control signal that instructs the protection line ident signal generation unit to perform inversion of signal when the number of mismatches between the polarity indicated by the signal outputted from the sign detection unit and the polarity indicated by the signal outputted from the protection line ident signal generation unit reaches a predetermined number of times; and
an output terminal for outputting the output signal from the protection line ident signal generation unit, as a line ident signal.

13. A chrominance signal demodulation apparatus as defined in claim 12 wherein said second line ident detection unit further includes an inversion function stop unit for counting the number of horizontal sync signals inputted between vertical sync signals, and disabling the control signal outputted from the inversion control unit until the count value exceeds a predetermined value.

* * * * *